(12) United States Patent
Carmi et al.

(10) Patent No.: US 6,310,721 B2
(45) Date of Patent: *Oct. 30, 2001

(54) NIGHT VISION MONOCULAR

(75) Inventors: Jacob Carmi, Gan Yavne; Levi Makmal, Lod, both of (IL)

(73) Assignee: International Technologies (Lasers) Ltd., Rishon-Lezion (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/209,680

(22) Filed: Dec. 11, 1998

(51) Int. Cl.⁷ ..................................................... G02B 23/00
(52) U.S. Cl. ........................... 359/399; 359/429; 359/813
(58) Field of Search ..................................... 359/425, 429, 359/433, 643, 720, 399, 407, 813

(56) References Cited

U.S. PATENT DOCUMENTS

| | | |
|---|---|---|
| 4,449,783 | 5/1984 | Witte . |
| 4,669,833 | * 6/1987 | Mise ...................... 359/420 |
| 4,734,939 | 4/1988 | Copp . |
| 5,029,963 | 7/1991 | Naselli et al. . |
| 5,084,780 | 1/1992 | Phillips . |
| 5,535,053 | 7/1996 | Baril et al. . |

* cited by examiner

*Primary Examiner*—Cassandra Spyrou
*Assistant Examiner*—Mark A. Robinson

(57) ABSTRACT

A night vision monocular having an optical axis is provided which includes a housing having a distal end and a proximal end; an objective lens assembly having at least one objective lens, the objective lens assembly being engaged within the housing at the distal end; an eyepiece lens assembly having at least one eyepiece lens, the eyepiece lens assembly being engaged within the housing at the proximal end; and an image intensifying tube being engaged within the housing between the objective lens assembly and the eyepiece lens assembly and optically communicating with the objective lens assembly and the eyepiece lens assembly, such that light entering the night vision monocular via the objective lens assembly is intensified via the image intensifying tube and further such that the intensified light is focused via the eyepiece lens assembly onto an eye of a viewer. At least one of the objective lens assembly and the eyepiece lens assembly includes at least one eccentrically rotatable eccentric element, whereas the objective lens assembly and the eyepiece lens assembly include, in combination, a minimum of two eccentrically rotatable eccentric elements, so as to enable to self collimate the optical axis of the night vision monocular within a predetermined image offset range, so as to enable to combine two night vision monoculars at random into an adjustment-free night vision binocular.

9 Claims, 7 Drawing Sheets

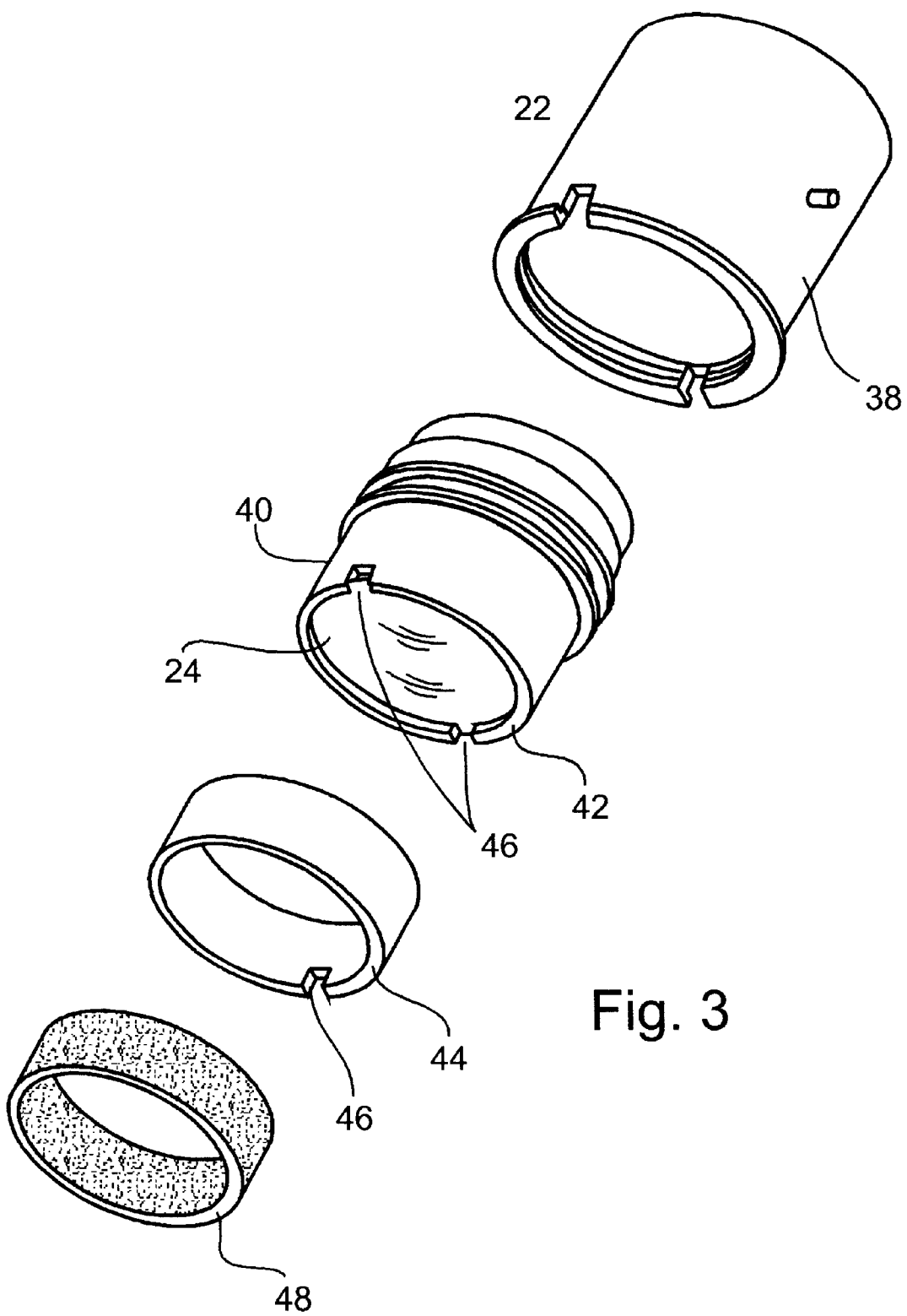

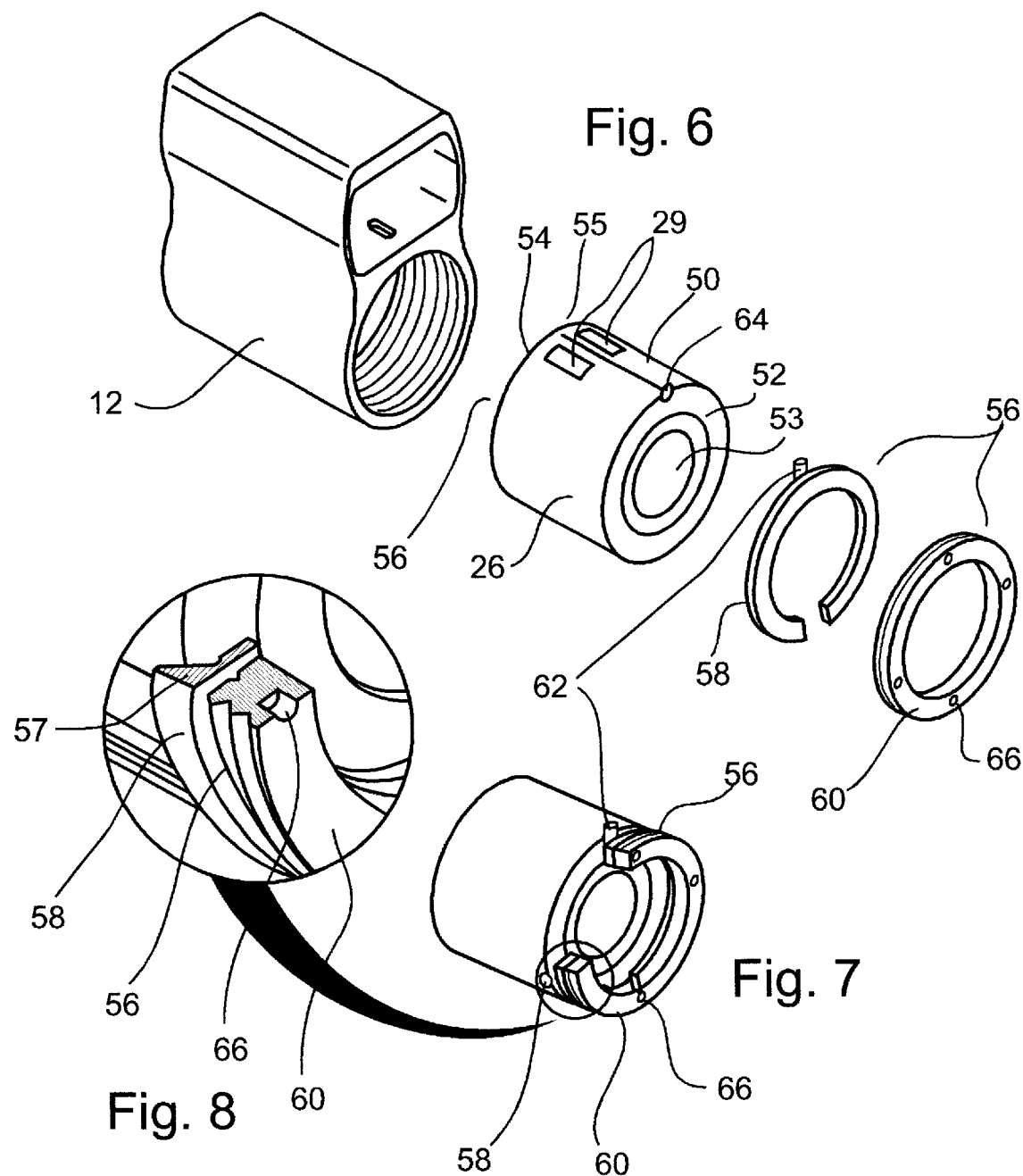

NIGHT VISION MONOCULAR

FIELD AND BACKGROUND OF THE INVENTION

The present invention relates to a night vision monocular and, more particularly, to a night vision monocular equipped with a mechanism which enables to collimate the optical axis thereof within a predetermined image offset range, so as to enable to combine two night vision monoculars at random into an adjustment-free night vision binocular, and/or a locking mechanism for preventing permanent longitudinal and permanent lateral displacements of an image intensifying tube implemented therein.

Night vision devices are typically composed of a housing which houses an objective lens assembly at the distal end for collecting incident light, an eye piece lens assembly situated at the proximal end for displaying the light intensified image to the operator and an Image Intensifying Tube (IIT), situated between the objective lens assembly and the eyepiece lens assembly and which translates the collected photons to electrons and back to photons and thus intensifies the amount of light that reaches the eye.

First generation IITs are composed of a photocathode element which serves for collecting photon and for converting them into electrons. IITs further include phosphoranode element which is phosphorescent and thus reconverts the electrons into photons. Each step is characterized by signal amplification. Second generation IITs further include a multichannel plate (MCP) disposed between the photocathode and the phosphoranode and serves for further amplifying the electron signal obtained from the photocathode. The photocathode of third generation IITs contains Gallium-Arsenide (GaAs) which provides for improved sensitivity (i.e., conversion of photons to electrons ratio) and broader spectral range.

In some IITs, an additional component termed a fiber optic inverter is placed adjacent, and in close proximity, to a proximal end of the phosphoranode and is utilized for the reversion of an inverted image. Monoculars, which do not employ a fiber optic inverter, often utilize inverting lenses for inverting the image.

Night vision devices are widely used in the military to provide soldiers, aviators and sailors with the ability to passively view objects at night or during other low light conditions.

Night vision devices are traditionally manufactured as monocular assemblies or binocular assemblies depending upon the application being addressed. For instance, most night vision devices used by aviators and by soldiers operating vehicles are produced as binocular assemblies. This provides the operator with the needed depth perception during low light conditions. Examples of such night vision binocular devices are disclosed, for example, in U.S. Pat. No. 4,449,783 to Witte.; and U.S. Pat. No. 4,734,939 to Copp.

Monocular night vision devices often serve dedicated purposes, such as a gun sight or in combination with a camera lens, but there also exist many hand held "spotting scopes" used both commercially and by the military and law enforcement agencies. Examples of such monocular devices are disclosed, for example, in U.S. Pat. No. 5,084,780 to Phillips, U.S. Pat. No. 5,029,963 to Naselli.

Modular night vision systems, where independent night vision monocular assemblies can be selectively used by an operator to create a binocular device, also exist. Such assembled binocular devices are disclosed, for example, in U.S. Pat. No. 5,535,053 to Baril et al.

In monocular devices the incident beams of light are processed by the objective, IIT unit and the eyepiece. These optical elements are to be aligned with the optical path of the eye in what is known as self collimation. Unfortunately, perfectly collimated devices do not exist and thus misalignment of the optical elements with the optical path of the eye of the device creates a shift in the processed beams which thereby leads to a shift of the perceived image by an angle of 1–3°. In monocular devices this shift dislocates image positioning as perceived by the operator.

Although this problem in monocular devices presents difficulties, it is readily corrected for by the adaptation of the operator. However when such monocular devices are incorporated to form binocular assemblies, the shift inherent to both monocular units creates a stereoscopic image which oftentimes is composed of converging, diverging or even dipverging images of the two monocular devices. This, in turn, produces a strain on the operators eyes and brain, as oftentimes the operator will try to correct for converging or diverging images by converging or diverging the eyes, respectively, while the human eye anatomy is not at all adapted for correcting for dipverging images.

This problem was partially addressed in aviation night vision integrated systems (ANVIS), e.g., by Litton (AVS-6, PVS-15) and ITT Defense & Electronics (AVS-9). In ANVIS, each monocular includes a single eccentric element implemented in the eyepiece assembly thereof. Such an eccentric element enables to shift the optical axis of its respective monocular with precision of several degrees, say 3–5°. By co-adjusting paired monoculars, one can achieve optical axes adjustments (relative collimation) within a tolerance of delta 0.3–1° for converging or diverging images and delta 0.3–0.5° for dipverging images.

It is clear from the above description that monoculars of an ANVIS should be paired and only thereafter adjusted to achieve the reported tolerances. In other words, since the precision of adjustment of each monocular is relatively low, the co-adjustment of paired monoculars is essential for achieving the required tolerances.

It is further clear from the above description that optical axis adjustment is only relative and not absolute. Thus, pairing monoculars after adjustment is not possible, since such paired monoculars will clearly offset from the required tolerances.

Thus, ANVIS lack an effective mechanism for fine tuning for correction of divergent, convergent or dipvergent images of independent monoculars thereof, so as to enable to combine two night vision monoculars at random into an adjustment-free night vision binocular because self (as opposed to relative) collimation within a reasonable tolerance cannot be achieved for any of the monoculars.

There is thus a widely recognized need for, and it would be highly advantageous to have, a night vision monocular equipped with a mechanism which enables to self collimate the optical axis thereof within a predetermined image offset range, so as to enable to combine two night vision monoculars at random into an adjustment-free night vision binocular.

One additional limitation associated with prior art monoculars is the susceptibility to permanent lateral displacement of the IIT. This problem is of greater consequences for monoculars employed under rigorous conditions, such as those present in a battlefield.

A precise path of a collimated beam as created by monocular's components depends on the ability of all components to sustain a precise alignment with respect to each other, as shifts of these components, may lead to discollimation along with distortion or defocusing of the perceived image. Of the three optical components which are involved in light processing in monoculars, the image intensifier tube (IIT) is the most sensitive to movements and is often the major contributor to discollimation and defocusing due to lateral and/or longitudinal displacements, respectively. The problem is further intensified when the IIT unit employs a fiber optic inverter as described, which effectively doubles any lateral deviation from the true optical path.

To at least partially solve these problems prior art monoculars have resorted to anchoring the IIT to the device housing via a retaining ring supplemented with an O-ring which interface with the IIT, thus allowing for controlled recoverable movement of the IIT unit in response to shock. Although this solution is quite effective in preventing a permanent longitudinal displacement of the IIT unit, it does little in preventing lateral displacements thereof.

There is thus a widely recognized need for, and it would be highly advantageous to have, a night vision monocular that uses a mechanism for anchoring the IIT unit within a housing thereof, such that both permanent lateral and longitudinal displacements are reduced.

SUMMARY OF THE INVENTION

According to the present invention there is provided a night vision monocular having an optical axis comprising (a) a housing having a distal end and a proximal end; (b) an objective lens assembly having at least one objective lens, the objective lens assembly being engaged within the housing at the distal end; (c) an eyepiece lens assembly having at least one eyepiece lens, the eyepiece lens assembly being engaged within the housing at the proximal end; and (d) an image intensifying tube being engaged within the housing between the objective lens assembly and the eyepiece lens assembly and optically communicating with the objective lens assembly and the eyepiece lens assembly, such that light entering the night vision monocular via the objective lens assembly is intensified via the image intensifying tube and further such that the intensified light is focused via the eyepiece lens assembly onto an eye of a viewer According to further features in preferred embodiments of the invention described below, at least one of the objective lens assembly and the eyepiece lens assembly includes at least one eccentrically rotatable eccentric element, whereas the objective lens assembly and the eyepiece lens assembly include, in combination, a minimum of two eccentrically rotatable eccentric elements, so as to enable to self collimate the optical axis of the night vision monocular within a predetermined image offset range, so as to enable to combine two night vision monoculars at random into an adjustment-free night vision binocular.

According to still further features in the described preferred embodiments, the image intensifying tube includes a distal circumference and a proximal circumference, at least one of the distal circumference and the proximal circumference is fixed within the housing by a locking mechanism for preventing permanent longitudinal and permanent lateral displacements of the image intensifying tube within the housing.

According to still further features in the described preferred embodiments at least one of the objective lens assembly and the eyepiece lens assembly includes at least two independently eccentrically rotatable eccentric elements engaged within one another.

According to still further features in the described preferred embodiments the objective lens assembly includes at least one of the eccentrically rotatable eccentric elements and further wherein the eyepiece lens assembly includes at least one of the eccentrically rotatable eccentric elements.

According to still further features in the described preferred embodiments the night vision monocular further comprising a mount connected to the housing, the mount serves for removably connecting the night vision monocular to a head mount.

According to still further features in the described preferred embodiments the image intensifying tube includes a photocathode and a phosphoranode operatively engaged within a holder.

According to still further features in the described preferred embodiments the image intensifying tube further includes a multi channel plate disposed between the photocathode and the phosphoranode.

According to still further features in the described preferred embodiments the night vision monocular further comprising a fiber optic inverter optically communicating with the phosphoranode.

According to still further features in the described preferred embodiments the photocathode is a Gallium-Arsenide photocathode.

According to still further features in the described preferred embodiments the objective lens assembly includes the at least two independently eccentrically rotatable eccentric elements.

According to still further features in the described preferred embodiments the objective lens assembly includes a lens holder engaging the at least one objective lens, whereas one of the at least two independently eccentrically rotatable eccentric elements is integrally formed with the lens holder and further whereas the other independently eccentrically rotatable eccentric element of the at least two independently eccentrically rotatable eccentric element engages the independently eccentrically rotatable eccentric elements integrally formed with the lens holder.

According to still further features in the described preferred embodiments the objective lens assembly further includes a lens housing and an eccentric seal, the lens housing serves for housing the lens holder, whereas the eccentric seal serves for sealing an eccentric gap formed between the lens holder and the lens housing.

According to still further features in the described preferred embodiments the eyepiece lens assembly includes the at least two independently eccentrically rotatable eccentric elements.

According to still further features in the described preferred embodiments the eyepiece lens assembly includes a lens holder engaging the at least one eyepiece lens, whereas one of the at least two independently eccentrically rotatable eccentric elements is integrally formed with the lens holder and further whereas the other independently eccentrically rotatable eccentric element of the at least two independently eccentrically rotatable eccentric element engages the independently eccentrically rotatable eccentric elements integrally formed with the lens holder.

According to still further features in the described preferred embodiments the eyepiece lens assembly further includes a lens housing and an eccentric seal, the lens housing serves for housing the lens holder, whereas the eccentric seal serves for sealing an eccentric gap formed between the lens holder and the lens housing.

According to still further features in the described preferred embodiments the locking mechanism includes a first locking ring formed with a circular wedge, the wedge being forced between the distal circumference or the proximal circumference and the housing, so as to prevent the permanent lateral displacement of the image intensifying tube within the housing.

According to still further features in the described preferred embodiments the locking mechanism further includes a second locking ring, so as to prevent the permanent longitudinal displacement of the image intensifying tube within the housing, the second locking ring further serves for forcing the wedge of the first locking ring between the distal circumference or the proximal circumference and the housing.

According to still further features in the described preferred embodiments the locking mechanism further includes a rotation preventing mechanism, so as to prevent the image intensifying tube from rotating.

According to still further features in the described preferred embodiments the locking mechanism further includes a rotation preventing mechanism, so as to prevent the image intensifying tube from rotating.

According to still further features in the described preferred embodiments the rotation preventing mechanism includes a key-way connected to, or integrally formed with, the first ring and serves for engaging a recess formed in the distal circumference or the proximal circumference of the image intensifying tube.

According to still further features in the described preferred embodiments the locking mechanism serves for fixing the distal circumference.

The present invention successfully addresses the shortcomings of the presently known configurations by providing a night vision monocular which enables an accurate self collimation of the optical path through adjustments of either the objective lens assembly positioning, and/or the eyepiece lens assembly positioning. The present invention further successfully addresses the shortcomings of the presently known configurations by enabling the locking of the image intensifying tube in the night vision monocular housing, so as to prevent permanent lateral, longitudinal and rotational displacements of the image intensifying tube.

BRIEF DESCRIPTION OF THE DRAWINGS

The invention herein described, by way of example only, with reference to the accompanying drawings, wherein:

FIG. 3 is an exploded isometric view of an eyepiece lens assembly, according to the present invention, showing an eyepiece lens housing, an eyepiece lens holder formed with integrated first eccentric element, a second eccentric element and an eccentric seal.

FIG. 6 is an exploded isometric view of a housing of the monocular according to the present invention and, of an image intensifying tube and of a locking mechanism employed therewith, according to the present invention;

FIG. 7 is a cutaway isometric view of the locking mechanism engaged with the image intensifying tube, according to the present invention;

FIG. 8 is an enlargement of the circled portion of FIG. 7; and

DESCRIPTION OF THE PREFERRED EMBODIMENTS

Figure 1:
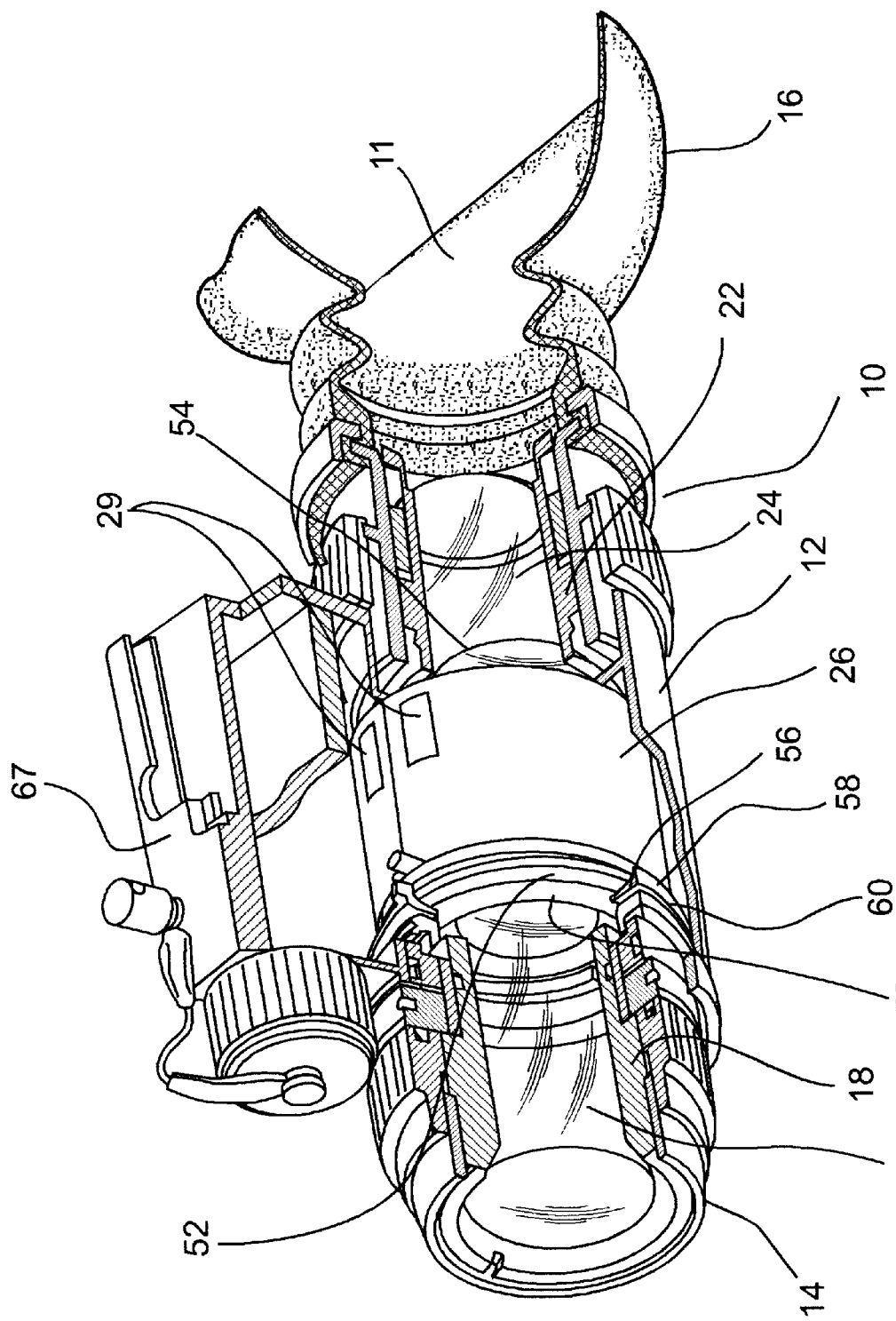
FIG. 1 is a cutaway isometric view of a night vision monocular according to the present invention.

The present invention is of a night vision monocular which can be used to enable night vision. Specifically, the present invention can be used to provide a night vision monocular spotting scope (hand held, tripod mounted or head mount mounted), a night vision gunsite, a night vision camera lens and a night vision binocular (hand held, tripod mounted or head mount mounted).

The principles and operation of a night vision monocular according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 illustrates a night vision monocular in accordance with the teachings of the present invention, which is referred to, hereinbelow, as monocular 10. As used herein in the specification and in the claims section below, the term "night vision monocular" refers to any device for effecting vision under low light conditions, e.g., at night, some are listed hereinabove. FIGS. 1–7 illustrate some preferred embodiments of night vision monocular 10 according to the present invention.

As shown in FIG. 1, night vision monocular 10 includes a housing 12. Housing 12 is formed with a distal end 14 and a proximal end 16.

As used herein in the specification and in the claims section that follows, the term "distal end" and "proximal end" refer to opposite ends, wherein a proximal end is closer to an operator, whereas a distal end is farther therefrom.

Housing 12 is typically formed of plastic or metal and serves as follows (i) for holding and protecting the optical components of monocular 10; (ii) for providing an integrally formed with or attached thereto, light guard 11, or adapter (mount, not shown) for optically connecting monocular 10 to other optical instruments, such as, but not limited to, cameras, telescopic lenses, etc.; and (iii) for providing an integrally formed with or attached thereto mount for mounting monocular 10 onto a pod (say tripod) or onto a head mount, such as a helmet. The latter mount is shown in FIG. 1 at 67. In the example provided in FIG. 1, mount 67 further serves for housing a power source, such as a battery, for providing monocular 10 with power for its operation, as further detailed hereinunder. According to a preferred embodiment mount 67 serves for removably connecting night vision monocular 10 to a head mount (not shown).

According to the present invention, housing 12 houses an objective lens assembly 18. Assembly 18 includes at least one objective lens 20. As best seen in FIG. 1, assembly 18 is positioned at distal end 16 of housing 12, such that light incident on objective lens assembly 18 is focused, and directed along the optical path of night vision monocular 10.

Further according to the present invention, housing 12 further houses an eyepiece lens assembly 22. Assembly 22 includes at least one eyepiece lens 24. Eyepiece lens assembly 22 is engaged within housing 12 at its proximal end 16, such that assembly 22 focuses an image, which is produced by an image intensifying tube, as further elaborated hereinunder, onto an eye of an operator.

Thus, further according to the present invention, housing 12 further houses an image intensifying tube 26. Tube 26 is engaged within housing 12 between objective lens assembly 18 and eyepiece lens assembly 22 and is optically communicating therewith, such that light entering night vision monocular 10 via objective lens assembly 18 is focused and intensified via image intensifying tube 26 and further such that intensified light is focused via eyepiece lens assembly 22 onto the eye of the operator.

According to a preferred embodiment of the present invention, and as further exemplified for several of the cases hereinunder, at least one of objective lens assembly 18 and eyepiece lens assembly 22 includes at least one eccentrically rotatable eccentric element. As further exemplified hereinunder, objective lens assembly 18 and eyepiece lens assembly 22 include, in combination, a minimum of two eccentrically rotatable eccentric elements, so as to enable to self collimate the optical axis of night vision monocular 10 within a predetermined image offset range, so as to enable to combine two night vision monoculars at random into an adjustment-free night vision binocular.

As used herein in the specification and in the claims section that follows, the phrase "image offset range" refers to permitted deviations from the optical path of the eye in any direction. Such deviations, according to preferred embodiments of the invention, are of no more than 1°, preferably no more than 0.8°, more preferably no more than 0.5°, most preferably no more than 0.3°, nearly ideally, no more than 0.2° or preferably less than 0.1°, ideally 0°.

From the above description, it will be appreciated that the monocular according to the present invention structurally and functionally differs from prior art monoculars paired into binoculars (ANVIS) in that each of which contains at least two eccentric elements, whereas the number of eccentric elements employed in prior art binoculars is limited to one.

As such, the monocular according to the present invention can be collimated within the above specified deviation ranges with respect to the optical path of the eye (i.e., self collimated), whereas, collimating prior art binoculars, which include a single eccentric element, to such low self deviation levels is at all not possible.

It will be recalled from the Background section above that the sensitivity of adjustment of each such prior art monocular is limited to 3–5°. Indeed, the collimation strategy employed in ANVIS is relative (as opposed to self) collimation of the optical axes of paired monoculars one with respect to the other following their assembly into a binocular.

In sharp distinction, collimating the optical axis of the binocular according to the present invention is in relation to the optical path of the eye, i.e., self collimation.

As a result, one can select two monoculars according to the present invention at random and assemble then into a binocular in any rotational orientation, to thereby obtain an adjustment-free night vision binocular.

In addition, employing more than a single eccentric element enables higher tolerance for manufacturing mechanical offset defects.

Figure 2:
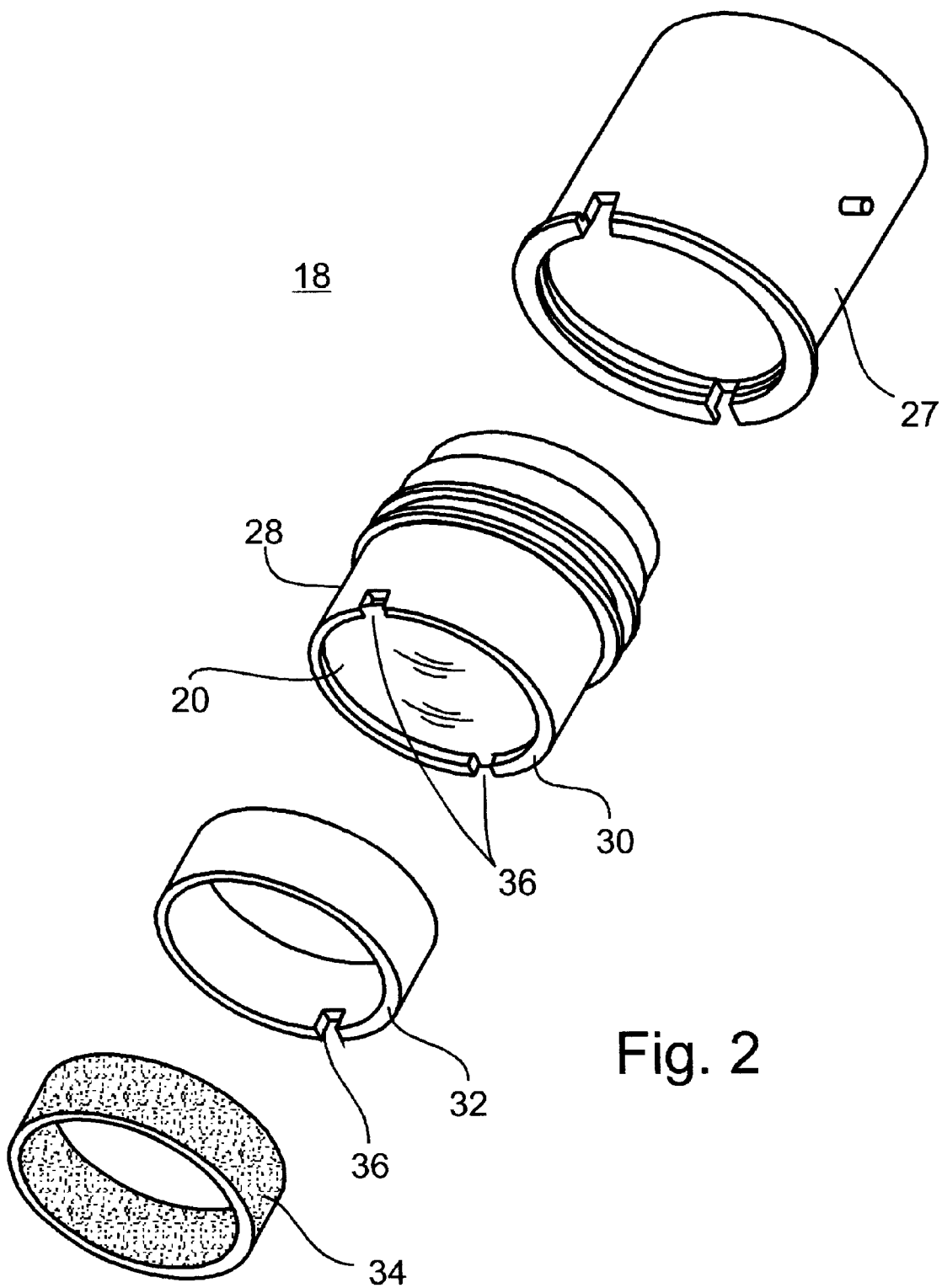
FIG. 2 is an exploded isometric view of an objective lens assembly showing an objective lens housing, the objective lens holder formed with integrated first eccentric element, a second eccentric element and an eccentric seal, according to the present invention.
Figure 4A:
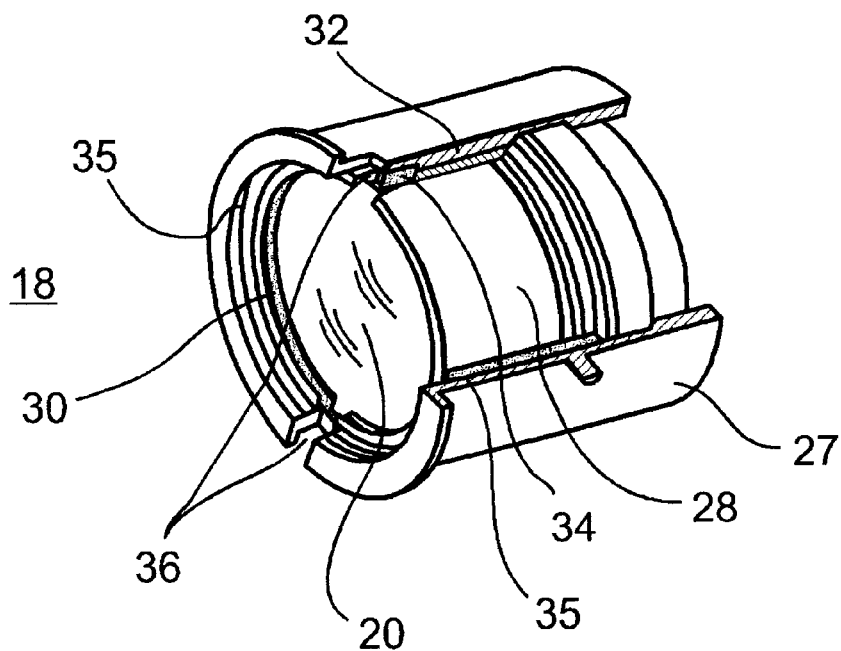
FIGS. 4a–b are partially cutaway isometric views of an assembled objective lens assembly according to the present invention in two different adjustment positions.
Figure 4B:
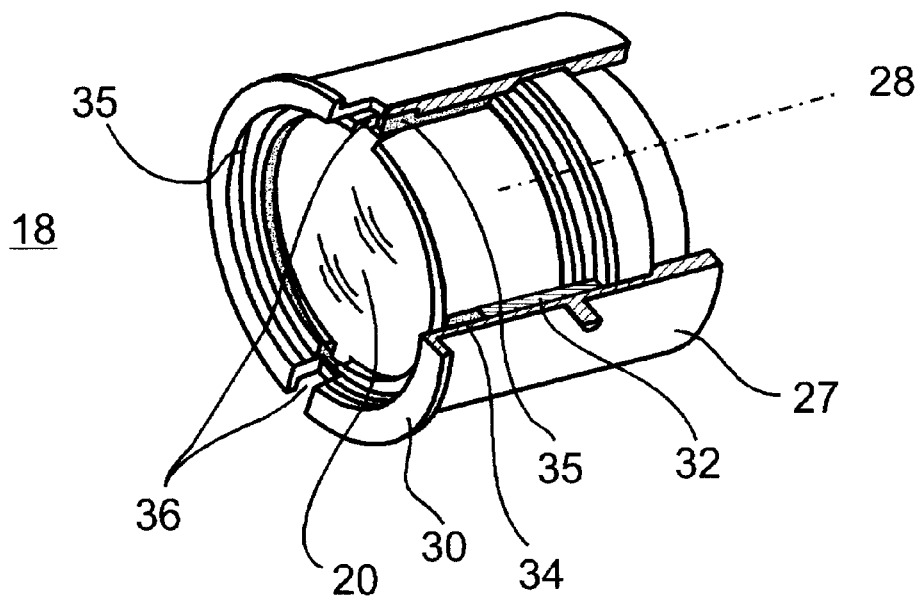

Thus, according to a preferred embodiment of the present invention, and as specifically shown in FIGS. 2 and 4a–b, objective lens assembly 18 includes an objective housing 27 which serves for engaging an objective lens holder 28, itself serves to engage objective lens or lenses 20. Housing 27 further serves for engaging two eccentrically rotatable eccentric elements, as further detailed hereinafter.

Thus, according to a preferred embodiment, a first eccentrically rotatable eccentric element 30 is integrally formed with objective lens holder 28. In other words, holder 28 itself being eccentric. Preferably, a second eccentrically rotatable eccentric element 32 engages first eccentrically rotatable eccentric element 30.

According to a preferred embodiment, each of first 30 and second 32 eccentric elements includes a recess 36, so as to allow an operator to effect, via an operator held mechanism (not shown), an independent eccentric rotation of first 30 and/or second 32 eccentric elements about the optical path, so as to effect a shift of objective lens or lenses 20 to effect collimation of the optical axis with respect to the optical path of the eye, or in other words, to effect self collimation.

Objective lens assembly 18 preferably further includes a removable eccentric seal 34. Eccentric seal 34 serves for sealing an eccentric gap 35 (FIGS. 4a–b) formed between objective lens holder 28 and objective housing 27. Seal 34 is typically made of a polymeric material, e.g., silicon rubber, exhibiting the required flexibility and/or elasticity for sealing gap 35, such that an inert gas, e.g., $N_2$, can be compressed into and sustained within binocular 10, as well accepted in the art.

According to the above embodiment of the present invention, self collimating night vision monocular 10 is effected by removing eccentric seal 34 from objective lens assembly 18, engaging recesses 36 in first 30 and second 32 eccentric elements with an operator held device, independently rotating each of elements 30 and/or 32 until sufficient collimation is obtained and refitting eccentric seal 34 to seal gap 35. Such a rotation is exemplified in FIGS. 4a–b.

Figure 5A:
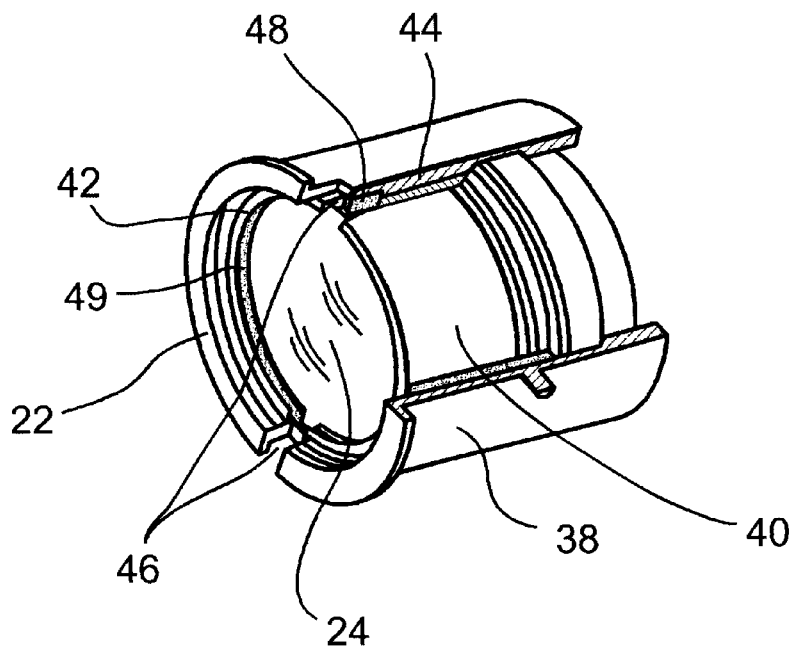
FIGS. 5a–b are partially cutaway isometric views of an assembled eyepiece lens assembly according to the present invention in two different adjustment positions.
Figure 5B:
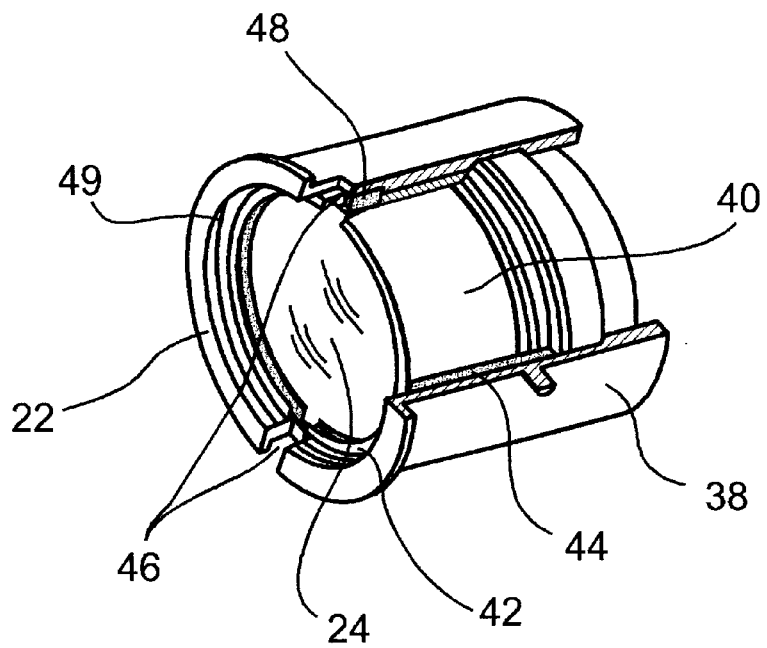

According to a presently preferred embodiment of the present invention, and as specifically shown in FIGS. 3 and 5a–b, eyepiece lens assembly 22 includes an eyepiece housing 38 which serves for engaging an eyepiece lens holder 40, itself serves to engage eyepiece lens or lenses 24. Housing 38 further serves for engaging two eccentrically rotatable eccentric elements, as further detailed hereinafter.

Thus, according to a preferred embodiment, a first eccentrically rotatable eccentric element 42 is integrally formed with eyepiece lens holder 40. In other words, holder 40 itself being eccentric. Preferably, a second eccentrically rotatable eccentric element 44 engages first eccentrically rotatable eccentric element 42.

According to a preferred embodiment, each of first 42 and second 44 eccentric elements includes a recess 46, so as to allow an operator to effect, via an operator held mechanism (not shown), an independent eccentric rotation of first 42 and/or second 44 eccentric elements about the optical path of the eye, so as to effect a shift of eyepiece lens or lenses 24 to effect collimation of the optical axis with respect to the optical path of the eye.

Eyepiece lens assembly 22 preferably further includes a removable eccentric seal 48. Eccentric seal 48 serves for sealing an eccentric gap 49 (FIGS. 5a–b) formed between eyepiece lens holder 40 and eyepiece housing 38. Seal 48 is typically made of a polymeric material, e.g., silicon rubber, exhibiting the required flexibility and/or elasticity for sealing gap 49, such that an inert gas, e.g., $N_2$, can be compressed into and sustained within binocular 10, as well accepted in the art.

According to the above embodiment of the present invention, self collimating night vision monocular 10 is effected by removing eccentric seal 48 from eyepiece lens assembly 22, engaging recesses 46 in first 42 and second 44 eccentric elements with an operator held device, independently rotating each of elements 42 and/or 44 until sufficient collimation is obtained and refitting eccentric seal 48 to seal gap 49. Such a rotation is exemplified in FIGS. 5a–b.

In another configuration according to the present invention the objective lens assembly includes one of the eccentrically rotatable eccentric elements integrated into the lens holder thereof, and the eyepiece lens assembly includes the other eccentrically rotatable eccentric element integrated into the lens holder thereof, and the gaps formed between the lens holders and the respective lens housings are sealed with pair of noneccentric seals.

In the latter case, self collimation is achieved by independently eccentrically rotating each of the eccentric elements.

Figure 9:
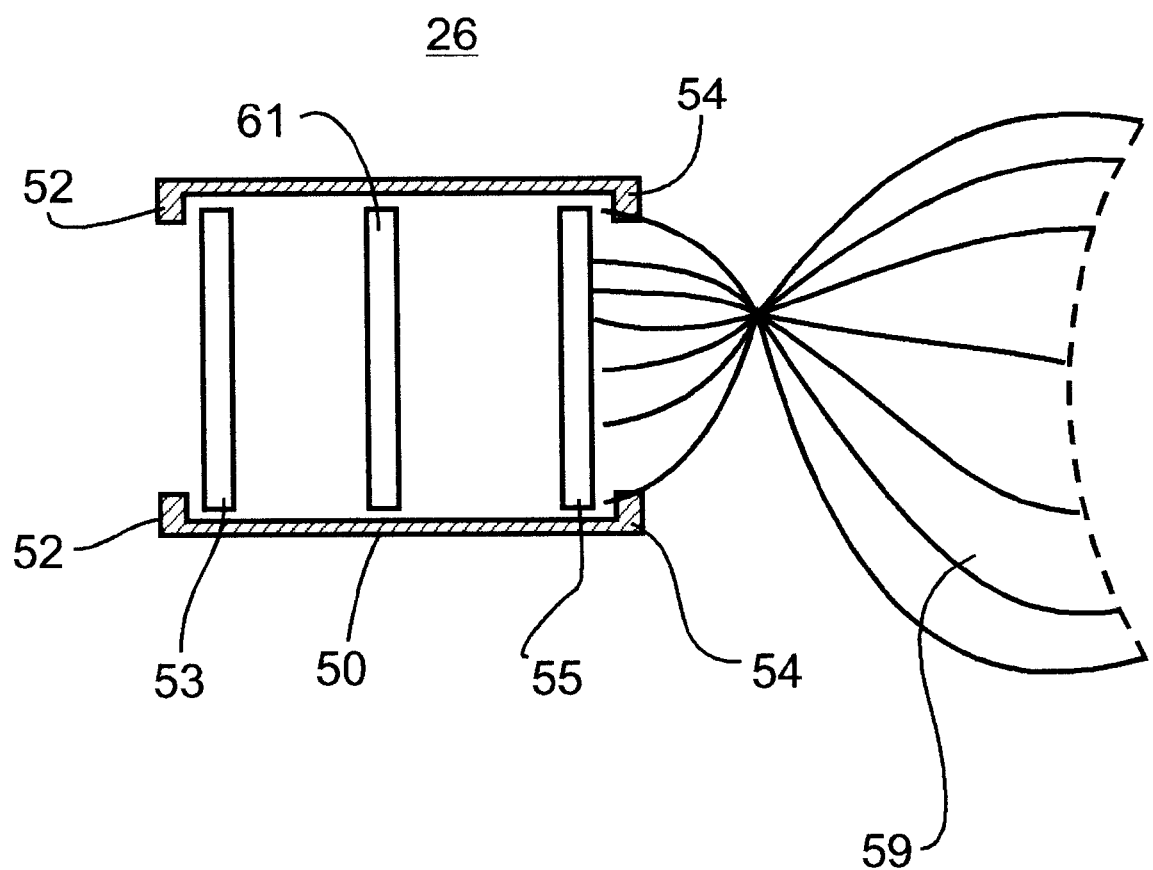
FIG. 9 is a schematic, cross sectional view of an image intensifying tube implemented in the night vision monocular according to the present invention.

FIG. 9, depicts a typical image intensifying tube 26. In its minimal and presently less preferred configuration, image intensifying tube 26 includes a housing 50 featuring a distal circumference 52 and a proximal circumference 54. A photocathode 53 is implemented within housing 50 close to distal circumference 52. A phosphoranode 55 is operatively engaged within housing 50 close to proximal circumference 54. Tube 26 operates as follows. Photons impinging on photocathode 53 cause the amplified release of electrons therefrom. The electrons are directed along the electrical field present within tube 26 and impinge on phosphoranode 55 to thereby cause the amplified release of photons therefrom. The latter photons are eventually perceived by the eye of the operator. The double amplification provides an intensified image. Photocathode 53 is preferably a Gallium-Arsenide photocathode, featuring improved properties as further detailed in the Background section above. As shown in FIGS. 1 and 6 tube 26 is provided with electrical contacts 29, for receiving power from a power source, say the power source housed in mount 67.

In a more effective configuration, tube 26 further includes a multichannel plate (MCP) 61. Plate 61 serves for providing one additional amplification step, whereby electrons arriving from photocathode 53 and impinging on plate 61, cause the amplified release of electrons therefrom, which are thereafter directed along the electrical field present within tube 26 and impinge on phosphoranode 55 to thereby cause the more amplified release of photons therefrom.

In yet a preferred configuration a fiber optic inverter 59 is placed adjacent, and in very close proximity, to phosphoranode 55 and serves for image inversion. Typically, phosphoranode 55 and inverter 59 are integrated into a single operative unit by coating the face of the fiber terminals of inverter 59 by phosphor. It will be appreciated that other optical configurations implemented either at the eyepiece assembly or (less preferably) at the objective assembly can be used to replace inverter 59. Inverter 59 can also serve for magnifying the perceived image in a predetermined magnification rate, so as to restore 1:1 magnification if so required.

A common feature of all image intensifying tubes available in the marketplace, e.g., the image intensifiers distributed by Litton, ITT and Orlil, is that housing 50 is made of a rather compliant polymeric material (typically NORYL), which limits effective clamping regions of tube 26 to the thicker circumferences 52 and/or 54. Such clamping is effected according to the prior art by a threaded rigid ring featuring a face formed with a circular recession for engaging a partially protruding O-ring made of an elastic material, typically silicon rubber. Upon threading the threaded ring in a complementary threaded region formed in the inner face of the housing of the monocular, the O-ring is pressed between the threaded rigid ring and the thicker circumference of the housing of the image intensifying tube, such that frictional forces on one hand, and the elasticity of the O-ring on the other hand, ensure that a permanent longitudinal displacement of the image intensifying tube in relation to the housing of the monocular is substantially prevented. As will be appreciated by one ordinarily skilled in the art, this configuration, however, is hardly effective in preventing permanent lateral displacement of the image intensifying tube in relation to the housing of the monocular, because lateral displacement is prevented only by the friction imposed by the O-ring.

According to another aspect, the present invention is directed at providing a night vision binocular in which lateral displacement of the image intensifying tube is substantially prevented.

FIGS. 1, and 6–8 further illustrate this aspect of the present invention. Thus, monocular 10 according to the present invention includes a locking mechanism 56 which serves for locking image intensifying tube 26 within housing 12. Locking mechanism 56 includes a first locking ring 58 formed with a circular wedge 57. As shown, ring 58 can be an open ring. Wedge 57 is forced between distal circumference 52 (or in another configuration, proximal circumference 54) of image intensifying tube 26 and housing 12 by a longitudinal force applied by a threaded second locking ring 60. First 58 and second 60 locking rings serve together to prevent permanent lateral and longitudinal displacements of image intensifying tube 26 within housing 12.

According to a preferred embodiment of the invention, first locking ring 58 further includes a key-way 62 connected to, or integrally formed, therewith which serves for engaging a dedicated recess 64 formed in distal circumference 52 (and/or proximal circumference 54 in the alternative) of image intensifying tube 26.

Second locking ring 60 is preferably formed with at least two recesses 66 (four are shown), so as to allow for rotating, threading and thereby locking second locking ring 60 into its position in housing 12.

Circular wedge 57 of first locking ring 58 is therefore forcibly wedged in between distal 52 (and/or proximal 54) circumference of image intensifying tube 26 and the inner face of housing 12, so as to prevent both permanent lateral and permanent longitudinal displacements thereof. Additionally, key-way 62, which fits into recess 64, serves to prevent rotational displacement of image intensifying tube 26.

It will be appreciated that both aspects of the present invention, i.e., the use of at least two eccentric elements per monocular for enabling low offset self collimation of the optical axis in relation to the optical path of the eye, and the use of the locking mechanism for preventing both permanent lateral and permanent longitudinal displacements of the image intensifying tube operate synergistically to provide a night vision monocular which is highly superior over the prior art night vision monoculars because the described locking mechanisms effectively maintains the superior collimation achieved.

The present invention is advantageous because adjustment-free night vision binoculars can be assembled from any random pair of identical night vision monoculars in any rotational orientation, while maintaining collimated stereoscopic image which is either comparable or superior to the stereoscopic images available using prior art nigh vision binoculars, such as ANVIS. The present invention is further advantageous because any specific night vision monocular an be used indifferently as a right or left eye monocular when integrated with a neighboring monocular into a night vision binocular as described.

While, the first aspect of the invention, i.e., the use of at least two eccentric elements is of specific advantages in binocular applications, the second aspect of the present invention can find many uses in binocular as well as monocular applications.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A night vision monocular having an optical axis comprising:

(a) a housing having a distal end and a proximal end;

(b) an objective lens assembly having at least one objective lens, said objective lens assembly being engaged within said housing at said distal end;

(c) an eyepiece lens assembly having at least one eyepiece lens, said eyepiece lens assembly being engaged within said housing at said proximal end; and (d) an image intensifying tube being engaged within said housing between said objective lens assembly and said eyepiece lens assembly and optically communicating with said objective lens assembly and said eyepiece lens assembly, such that light entering the night vision monocular via said objective lens assembly is intensified via said image intensifying tube and further such that said intensified light is focused via said eyepiece lens assembly onto an eye of a viewer;

wherein at least one of said objective lens assembly and said eyepiece lens assembly includes at least one eccentrically rotatable eccentric element, whereas said objective lens assembly and said eyepiece lens assembly include, in combination, a minimum of two eccentrically rotatable eccentric elements, the optical axis of the night vision monocular is self collimated via said eccentrically rotatable eccentric elements within a predetermined image offset range, such that two night vision monoculars are combinable at random into an adjustment-free, stereoscopically operable, night vision binocular.

2. The night vision monocular of claim 1, wherein at least one of said objective lens assembly and said eyepiece lens assembly includes at least two independently eccentrically rotatable eccentric elements engaged within one another.

3. The night vision monocular of claim 2, wherein said eyepiece lens assembly includes said at least two independently eccentrically rotatable eccentric elements.

4. The night vision monocular of claim 3, wherein said eyepiece lens assembly includes a lens holder engaging said at least one eyepiece lens, whereas one of said at least two independently eccentrically rotatable eccentric elements is integrally formed with said lens holder and further whereas the other independently eccentrically rotatable eccentric element of said at least two independently eccentrically rotatable eccentric element engages said independently eccentrically rotatable eccentric elements integrally formed with said lens holder.

5. The night vision monocular of claim 1, further comprising a mount connected to said housing, said mount serves for removably connecting the night vision monocular to a head mount.

6. The night vision monocular of claim 1, wherein said image intensifying tube includes a photocathode and a phosphoranode operatively engaged within a holder.

7. The night vision monocular of claim 6, wherein said image intensifying tube further includes a multi channel plate disposed between said photocathode and said phosphoranode.

8. The night vision monocular of claim 6, further comprising a fiber optic inverter optically communicating with said phosphoranode.

9. The night vision monocular of claim 6, wherein said photocathode is a Gallium-Arsenide photocathode.

* * * * *